United States Patent
Yu et al.

(10) Patent No.: US 8,131,231 B2
(45) Date of Patent: Mar. 6, 2012

(54) METHOD AND APPARATUS FOR CANCELING INTERFERENCE IN A HYBRID TERMINAL SUPPORTING BOTH BROADCAST SERVICE AND MOBILE COMMUNICATION SERVICE, AND A HYBRID TERMINAL THEREOF

(75) Inventors: Hyun-Seok Yu, Seoul (KR); Hyun-Seok Oh, Seoul (KR); Hung-Su Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1132 days.

(21) Appl. No.: 11/945,752

(22) Filed: Nov. 27, 2007

(65) Prior Publication Data

US 2008/0130725 A1 Jun. 5, 2008

(30) Foreign Application Priority Data

Nov. 27, 2006 (KR) .......................... 10-2006-117963

(51) Int. Cl.
*H04B 1/38* (2006.01)
*H04M 1/00* (2006.01)

(52) U.S. Cl. ..................... 455/114.2; 455/63.1

(58) Field of Classification Search ............... 455/67.11, 455/115.1, 127.1, 63.1, 114.2, 556.1
See application file for complete search history.

(56) References Cited

U.S. PATENT DOCUMENTS

| | | | | |
|---|---|---|---|---|
| 6,107,960 A * | 8/2000 | Krasner | .................. | 342/357.59 |
| 6,442,375 B1 * | 8/2002 | Parmentier | .................. | 455/78 |
| 6,961,019 B1 * | 11/2005 | McConnell et al. | ..... | 342/357.59 |
| 7,444,165 B2 * | 10/2008 | van Rooyen | ............... | 455/552.1 |
| 7,688,774 B2 * | 3/2010 | Pajukoski et al. | ............. | 370/321 |
| 7,761,075 B2 * | 7/2010 | Cleveland et al. | ............ | 455/296 |
| 7,873,974 B2 * | 1/2011 | DaCosta | .......................... | 725/62 |
| 2002/0077147 A1 * | 6/2002 | Ito | .................. | 455/556 |
| 2003/0125019 A1 * | 7/2003 | Bajikar | .................. | 455/420 |
| 2005/0215284 A1 * | 9/2005 | Su et al. | .................. | 455/556.2 |
| 2005/0270995 A1 | 12/2005 | Byun et al. | | |
| 2006/0152408 A1 * | 7/2006 | Leinonen et al. | ........ | 342/357.12 |
| 2007/0066359 A1 * | 3/2007 | Zhuang | .................. | 455/557 |
| 2007/0135162 A1 * | 6/2007 | Banerjea et al. | ........... | 455/556.1 |
| 2009/0143034 A1 * | 6/2009 | Harpak | .................. | 455/150.1 |

FOREIGN PATENT DOCUMENTS

| | | |
|---|---|---|
| JP | 2001-237849 | 8/2001 |
| JP | 2006-261998 | 9/2006 |
| KR | 100360709 | 10/2002 |
| KR | 1020040096251 | 11/2004 |
| KR | 1020060017536 | 2/2006 |
| WO | WO 2004/110088 | 12/2004 |

* cited by examiner

*Primary Examiner* — Blane J Jackson
(74) *Attorney, Agent, or Firm* — The Farrell Law Firm, P.C.

(57) ABSTRACT

A method and apparatus for canceling interference during reception of a broadcast signal in a hybrid terminal including a broadcast receiver and a mobile communication terminal. In the interference cancellation apparatus, a gain controller adjusts transmission power of the mobile communication terminal, and a transmission power controller determines whether there is a burst of a broadcast signal that the broadcast receiver will receive. If there is a burst of the broadcast signal, the transmission power controller controls the gain controller to decrease transmission power of a mobile communication signal transmitted by the mobile communication terminal at a corresponding slot.

19 Claims, 6 Drawing Sheets

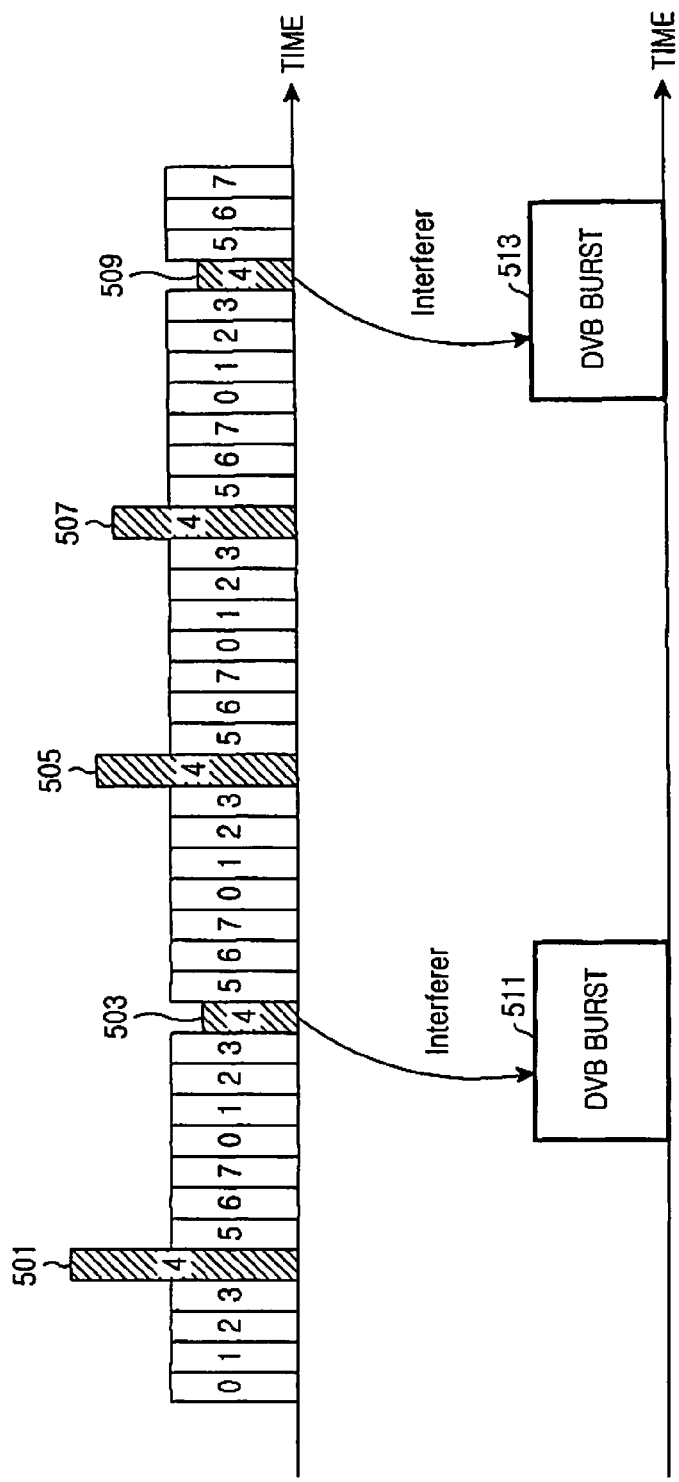

METHOD AND APPARATUS FOR CANCELING INTERFERENCE IN A HYBRID TERMINAL SUPPORTING BOTH BROADCAST SERVICE AND MOBILE COMMUNICATION SERVICE, AND A HYBRID TERMINAL THEREOF

PRIORITY

This application claims priority under 35 U.S.C. §119(a) to a Korean Patent Application filed in the Korean Intellectual Property Office on Nov. 27, 2006 and assigned Serial No. 2006-117963, the contents of which are incorporated herein by reference.

BACKGROUND OF THE INVENTION

1. Field of the Invention

The present invention relates generally to a method and apparatus for receiving broadcast signals, and in particular, to a method and apparatus capable of improving performance of a hybrid terminal realized by integrating, into one terminal, a terminal of a mobile communication system (hereinafter mobile communication terminal) and a broadcast receiver for receiving broadcast signals.

2. Description of the Related Art

Digital broadcasting systems have been developed to provide ubiquitous high-quality audio and video services by means of fixed terminals or mobile terminals.

The digital broadcasting systems can be classified into Digital Audio Broadcasting (DAB), Digital Radio Broadcasting (DRS), Digital Audio Radio System (DARS) and Digital Multimedia Broadcasting (DMB) capable of supporting audio, video and data services.

Recently, the Digital Video Broadcasting for Handheld (DVB-H) system that has enhanced mobility and portability of the European Research Coordination Agency project-147 (Eureka 147) system, which is another example of the European DAB system, and the Digital Video Broadcasting-Terrestrial (DVB-T) system, which is one of the digital broadcasting standards, is now attracting the public attention. To reduce power consumption of the portable terminal, DVB-H adopts the so-called Time Slicing Multiplexing scheme, which is for slicing a broadcast signal into time slots for individual channels, and carrying packetized broadcast signals of the individual channels over the time slots.

The recent digital communication system generally provides broadcast services, and the mobile communication system also tends to support not only the existing mobile communication services but also the broadcast services. Herein, the 'mobile communication service' should be construed to include the general voice call service, and the packet service such as Short Message Service (SMS). A hybrid terminal has also been developed, which is realized by uniting into one terminal a broadcast receiver of the broadcasting system and a terminal of the existing mobile communication system. For example, in Europe, a study is being conducted to develop a hybrid terminal realized by combining a DVB-T or DVB-H receiver as a broadcast receiver with a Global System for Mobile communications (GSM), Enhanced Data for GSM Evolution (EDGE), or Wideband-Code Division Multiple Access (W-CDMA) terminal as a mobile communication terminal.

One of the important matters that should be considered during the development of the hybrid terminal is how to design a structure of a Radio Frequency (RF) front-end unit of the terminal.

FIG. 1 illustrates the conceptual structure of a hybrid terminal supporting both a broadcast service and a mobile communication service.

Referring to FIG. 1, a hybrid terminal 100 includes a mobile communication terminal 110a and a broadcast receiver 110b in a single terminal 110, and is basically designed to transmit/receive (Tx/Rx) a broadcast service and a mobile communication service via different RF paths. The mobile communication terminal 110a includes an RF front-end unit 111 based on a Tx/Rx switching circuit or a duplexer. The hybrid terminal 100 transmits/receives mobile communication signals via a first ANTenna ANT1, and receives broadcast signals via a second ANTenna ANT2.

However, the hybrid terminal 100 with the structure of FIG. 1 may suffer from performance degradation due to the mutual signal interference between both signals because reception of the broadcast signal and transmission/reception of the mobile communication signal are performed in the single terminal. For example, the transmission signal of the mobile communication terminal 110a may serve as an interference signal to the received signal of the broadcast receiver 110b.

FIG. 2 illustrates an example in which a broadcasting system and a mobile communication system use adjacent frequency bands. In this example, a DVB-H system is used as the broadcasting system, and a GSM system is used as the mobile communication system.

Referring to FIG. 2, a DVB-H signal 201, or broadcast signal, uses 470 to 862 MHz, and a GSM signal 203, or mobile communication signal, uses 880 to 915 MHz or 925 to 960 MHz, showing that they use adjacent frequency bands. Therefore, the broadcast signal may serve as a partial interference signal to the mobile communication signal. More particularly, in the opposite case, the terminal's transmission signal in the mobile communication signal may interference with the broadcast signal. That is, in the hybrid terminal 100 of FIG. 1, because the mobile communication terminal 110a is installed together with the broadcast receiver 110b, the transmission signal of the mobile communication terminal 110a may interference with the broadcast receiver 110b, thus causing noticeable performance degradation.

To solve this problem, one method prevents reception of the broadcast service in the frequency band adjacent to the frequency band of the mobile communication system, and another method adds in the broadcast receiver a filter capable of canceling the mobile communication signal.

The former method can hardly be implemented when the scarcity and value of the frequency band are considered. Since the latter method adds a filter to the terminal, it considerably increases the production cost of the terminal. Also, an increase in the side lobe component of the mobile communication signal may increase a scope of the adjacent frequency band affected by the mobile communication signal, so the interference of the in-band mobile communication signal of the broadcasted received signal may cause performance degradation of the broadcast receiver.

Therefore, there is a need for a new solution capable of minimizing the performance degradation due to the mobile communication signal during broadcast signal reception without increasing the production cost of the hybrid terminal.

SUMMARY OF THE INVENTION

An aspect of the present invention is to address at least the problems and/or disadvantages and to provide at least the advantages described below. Accordingly, an aspect of the present invention is to provide a method and apparatus for canceling interference in a hybrid terminal that can transmit/receive a mobile communication signal and receive a broadcast signal, and a hybrid terminal thereof.

Another aspect of the present invention is to provide a method and apparatus for canceling interference caused by a transmission signal of a mobile communication terminal flowing into a broadcast receiver in a hybrid terminal including the mobile communication terminal and the broadcast receiver, and a hybrid terminal thereof.

According to the present invention, there is provided a method for canceling interference during reception of a broadcast signal in a hybrid terminal supporting a broadcast service and a mobile communication service, the method including determining whether there is a burst of a broadcast signal received at a current slot, and if so, decreasing transmission power of a mobile communication signal at the corresponding slot.

According to the present invention, there is provided an apparatus for canceling interference during reception of a broadcast signal in a hybrid terminal including a broadcast receiver and a mobile communication terminal, the apparatus including a gain controller for adjusting transmission power of the mobile communication terminal, and a transmission power controller for determining whether there is a burst of a broadcast signal that the broadcast receiver will receive, and if so, controlling the gain controller to decrease transmission power of a mobile communication signal transmitted by the mobile communication terminal at a corresponding slot.

According to the present invention, there is provided a hybrid terminal supporting a broadcast service and a mobile communication service, the terminal including a broadcast receiver for receiving a broadcast signal, a transmitter/receiver for transmitting/receiving a mobile communication signal, a gain controller for adjusting transmission power of the mobile communication signal, and a transmission power controller for determining whether the broadcast receiver is activated and whether there is a burst of the broadcast signal, and if both are so, controlling the gain controller to decrease transmission power of the mobile communication signal at a corresponding slot.

BRIEF DESCRIPTION OF THE DRAWINGS

The above and other aspects, features and advantages of the present invention will become more apparent from the following detailed description when taken in conjunction with the accompanying drawings in which:

FIGS. 5A and 5B illustrate transmission power of a mobile communication signal when a hybrid terminal receives a broadcast signal while transmitting the mobile communication signal according to the present invention;

DETAILED DESCRIPTION OF THE PREFERRED EMBODIMENTS

Figure 1:
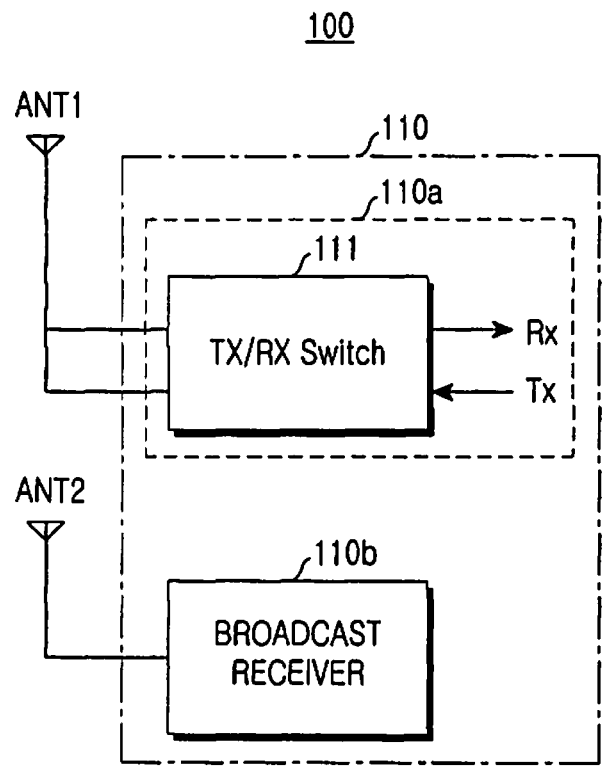
FIG. 1 illustrates a conventional hybrid terminal supporting both a broadcast service and a mobile communication service.
Figure 2:
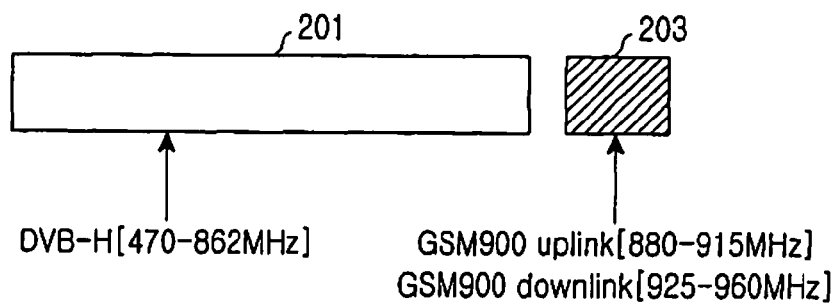
FIG. 2 illustrates a conventional example of a broadcasting system and a mobile communication system using adjacent frequency bands.

Preferred embodiments of the present invention will now be described in detail with reference to the annexed drawings. In the following description, a detailed description of known functions and configurations incorporated herein has been omitted for the sake of clarity and conciseness.

A brief description of the basic concept of the present invention will first be made. When a broadcast receiver included in a hybrid terminal is activated or enabled, the present invention controls transmission power of a mobile communication signal that can serve as interference to the broadcasted received signal, thereby improving reception performance of the broadcast signal. The present invention can control transmission power of the mobile communication signal considering various factors such as presence/absence of a burst of the broadcast signal, and quality of the broadcast signal. As a result, the hybrid terminal can efficiently reduce the interference to the received broadcast signal by controlling transmission power of the mobile communication signal.

A description of the present invention will be made herein on the assumption that the mobile communication system to which the hybrid terminal is applied is a GSM system, and the broadcasting system is a DVB-H system. However, the present invention can be applied to any communication system where frequency bands of the broadcast signal and the mobile communication signal are adjacent to each other. Therefore, it should be noted that the application of the present invention is not limited to the GSM system and the DVB-H system.

For a better understanding of the present invention, a description will be made of a power control scheme in the general GSM system. Basically, for the downlink, the base station's transmission power to the terminal is determined depending on a distance between the base station and the terminal. That is, transmission power to the terminal located close to the base station is lower, and transmission power to the terminal located far from the base station is higher. However, if the transmission power increases with the distance between the base station and the terminal in this manner, the interference signal of the entire network may increase.

However, for the uplink, the terminal controls transmission power on the basis of the call quality. That is, when the call quality remains at a set level, the terminal reduces the transmission power, and the capacity of the entire network can be improved by this power control.

In the foregoing power control scheme, attention should be paid to the power control in the uplink in connection with the present invention. For the downlink, even though the base station controls transmission power to a particular terminal, transmission power to another terminal in the corresponding cell also serves as interference from the standpoint of the broadcast receiver in the hybrid terminal, so the actual interference cancellation effect by the power control may not be noticeable in the downlink.

Therefore, the present invention discloses a scheme in which a hybrid terminal controls transmission power of a mobile communication signal to cancel interference during reception of a broadcast signal.

Generally, the scheme in which the terminal controls the transmission power can be classified into an open-loop control scheme in which the terminal measures the quality of the signal received from the base station and controls the transmission power depending on the measured signal quality, and a closed-loop control scheme in which the base station measures reception quality and reception power, and the terminal controls the transmission power depending on the measurement results received from the base station over a control channel.

Although the present invention will be described herein on the assumption that the hybrid terminal controls the transmission power by the closed-loop control scheme, the present invention can also be applied to the open-loop control scheme.

When the GSM system performs closed-loop control for the power control, information on the reception quality and reception power measured by the base station is delivered to the terminal over a measurement report 301 of a control channel, for example, SACCH.

Figure 3:
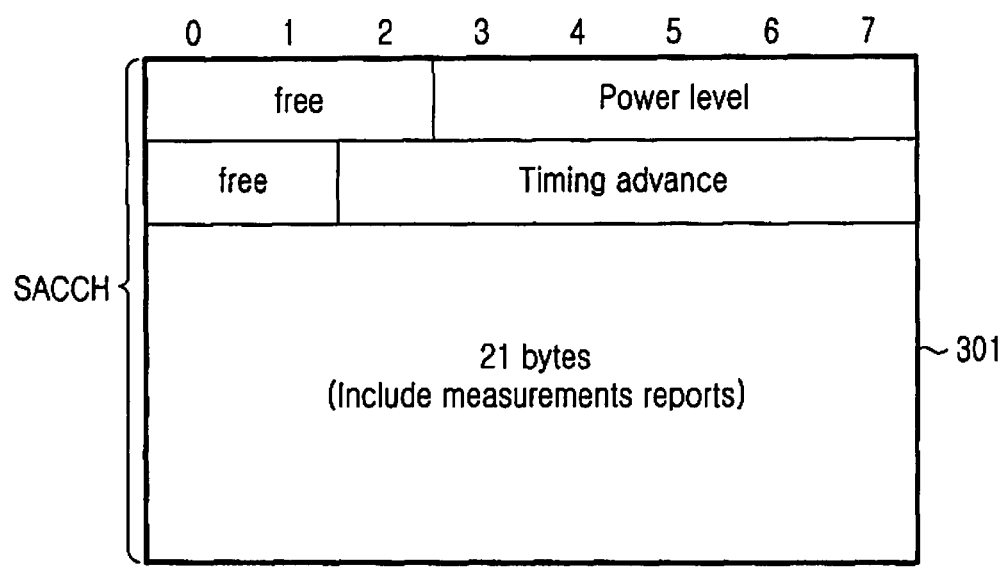
FIG. 3 illustrates a format of a Slow Associated Control Channel (SACCH) with a measurement report used for delivering information on the reception quality and reception power to a terminal by a base station of the GSM system.

FIG. 3 illustrates a format of an SACCH with a measurement report used for delivering information on the reception quality and reception power to a terminal by a base station of the GSM system.

A terminal receives the SACCH, and extracts, from the measurement report 301 included in the SACCH shown in FIG. 3, reception quality information RXQUAL and level information of the reception power RXLEV (hereinafter reception power information) measured by the base station. The reception quality information RXQUAL includes information indicating an error rate of a received signal, such as Bit Error Rate (BER), and the reception power information RXLEV includes a power level of the received signal. The base station measures reception quality and reception power of uplink transmission signal, and adjusts transmission power to the downlink depending on the measurement results, and the terminal adjusts transmission power of the uplink depending on the reception quality information RXQUAL and reception power information RXLEV received over, for example, an SACCH of the downlink.

This power control algorithm can be realized in several ways, and an example of the existing power control algorithm will be described below.

A definition of variables used in the existing power control algorithm is given in Table 1.

TABLE 1

| Variable | Description |
| --- | --- |
| $RXLEV_{ref}$ | Reference reception power level |
| $RXLEV_{rx}$ | Measured reception power level |
| $RXQUAL_{ref}$ | Reference reception quality (BER level) |
| $RXQUAL_{rx}$ | Measured reception quality (BER level) |
| $\alpha, \beta$ | Weights |
| PL | Power Level for transmission power adjustment |
| PC | Power Control value |

The terminal sets, as target values in Table 1, reference reception quality $RXQUAL_{ref}$, reference reception power $RXLEV_{ref}$, and weights $\alpha$ and $\beta$ which are multiplied by the reference reception power and the reference reception quality, respectively, and calculates a target Power Update level PU for transmission power adjustment in the uplink using the measured reception quality $RXQUAL_{ref}$ and the measured reception power $RXLEV_{rx}$ received from the base station. A PU value is calculated by Equation (1) as follows:

$$PU = \alpha(RXLEV_{ref} - RXLEV_{rx}) + \beta(RXQUAL_{ref} - RXQUAL_{rx}) \quad (1)$$

Because the PU value calculated by Equation (1) is a real-number value, a power control value PC, which is the minimum integer equal to or greater than the real-number PU value, is calculated using a cell function of Equation (2) to find it as an integer value. In Equation (2), $$PC = \lceil PU \rceil \quad (2)$$

The power level PL for transmission power adjustment in the terminal is updated as shown in Equation (3) depending on the PC value calculated by Equation (2). In Equation (3), $$PL = PL + PC \quad (3)$$

The terminal adjusts a gain of an amplifier within a scope of, for example, 0 to 30 dB, according to the PL value. The PL value undergoes a change level by level from 0 to 15 in units of, for example, 2 dB. In the PL value, the total number of levels and a gain difference between levels are variable.

Figures 4A, 4B:
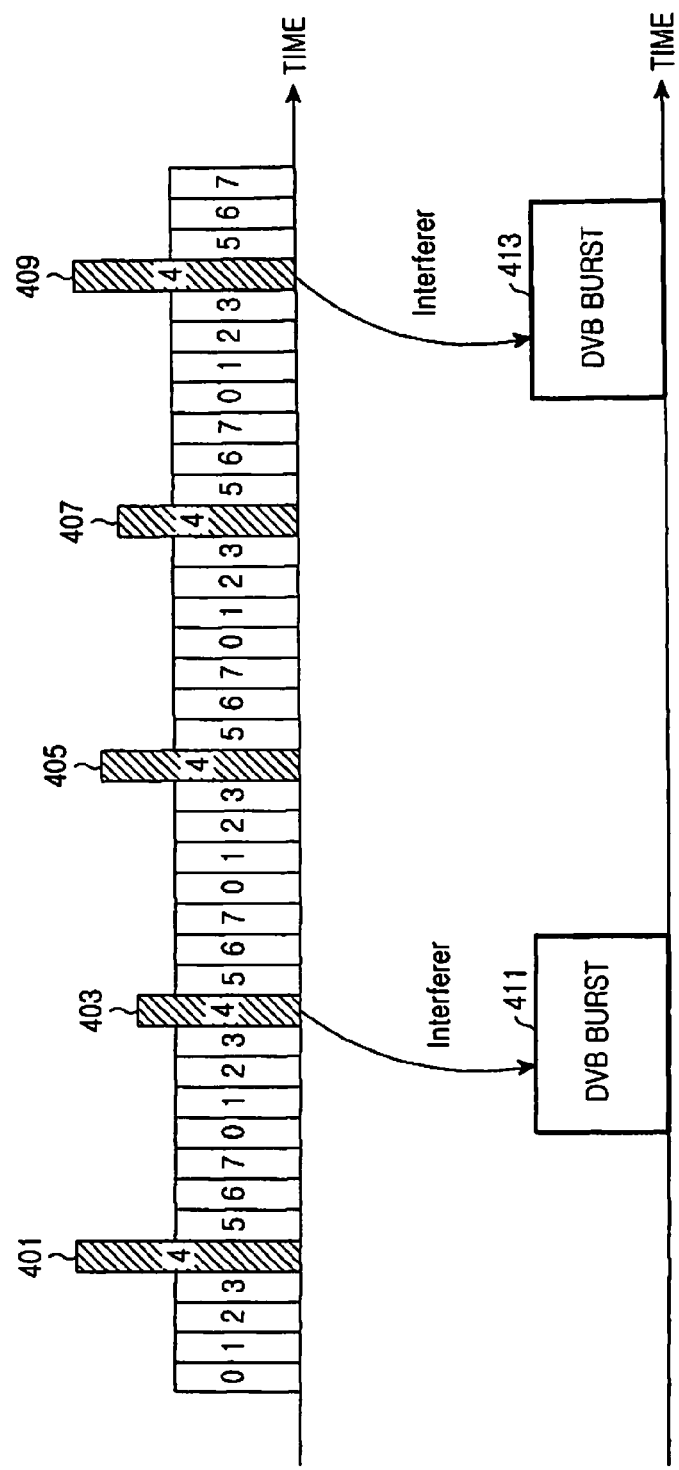
FIGS. 4A and 4B illustrate transmission power of a mobile communication signal when a hybrid terminal, to which the present invention is not applied, receives a broadcast signal while transmitting the mobile communication signal.

FIGS. 4A and 4B illustrate the transmission power of a mobile communication signal when a hybrid terminal, to which the present invention is not applied, receives a broadcast signal while transmitting the mobile communication signal.

A GSM signal shown in FIG. 4A is assumed as a mobile communication signal, and a DVB burst shown in FIG. 4B is assumed as a broadcast signal. Transmission power of the GSM signal serves as interference to DVB bursts 411 and 413 in time slots 403 and 409 corresponding to the DVB bursts 411 and 413, respectively. In order for the broadcast receiver in the hybrid terminal to receive the broadcast signal without loss, the base station should increase transmission power of the broadcast signal. However, it is not preferable to arbitrarily increase the transmission power of the broadcast signal.

Therefore, the present invention discloses a scheme for decreasing transmission power of a GSM signal, or mobile communication signal, at the time slot where a burst of the broadcast signal is received, as shown in FIG. 5.

FIGS. 5A and 5B illustrate the transmission power of a mobile communication signal when a hybrid terminal receives a broadcast signal while transmitting the mobile communication signal according to the present invention. A GSM signal shown in FIG. 5A is assumed as a mobile communication signal, and a DVB burst shown in FIG. 5B is assumed as a broadcast signal. While the broadcast receiver receives DVB bursts 511 and 513, transmission power of a GSM transmitter in the hybrid terminal decreases to a specific level at the corresponding slots 503 and 509 according to a power control algorithm of the present invention, resulting in a reduction in interference to the DVB bursts 511 and 513.

Figure 6:
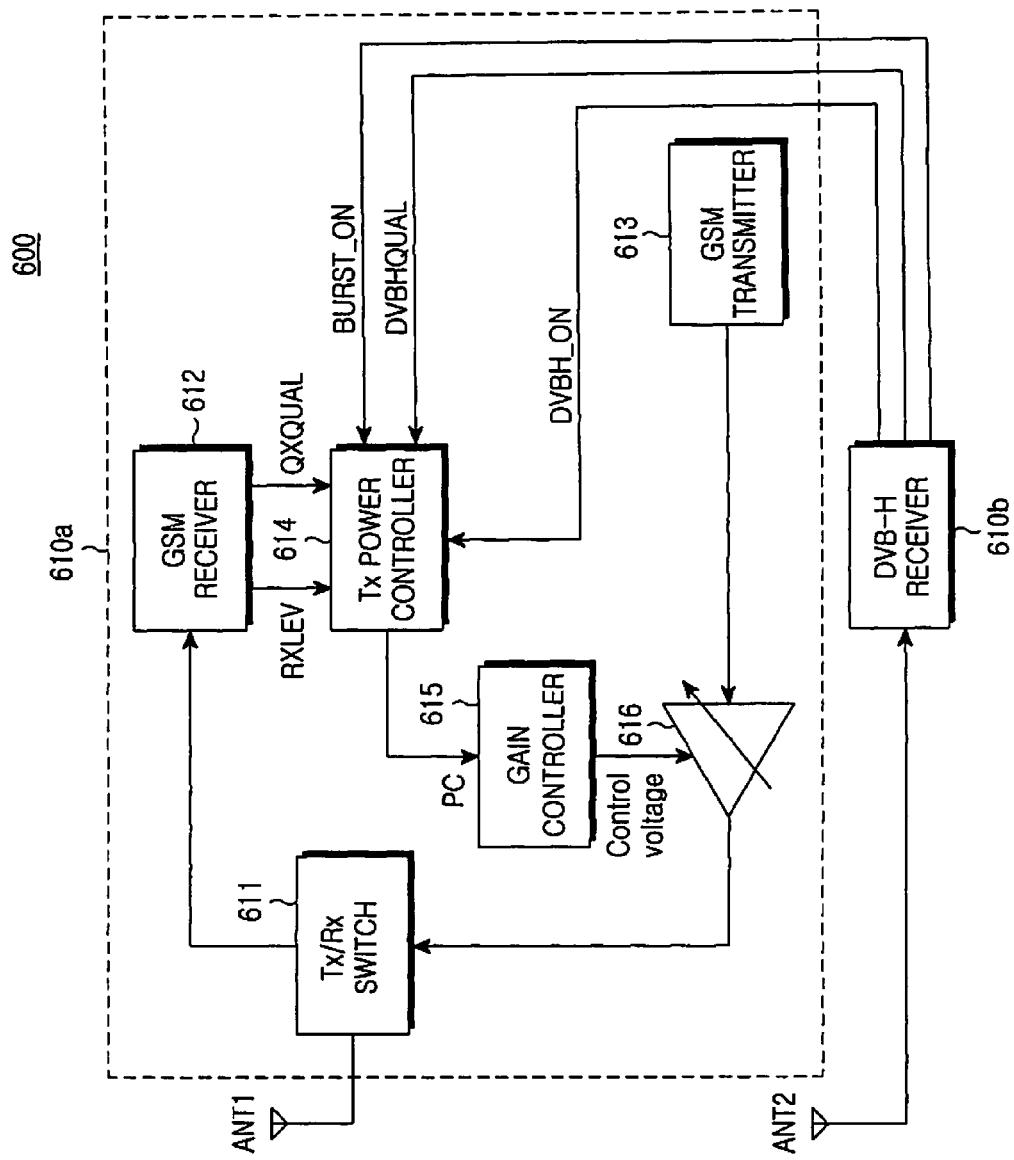
FIG. 6 illustrates a structure of a hybrid terminal supporting both a broadcast service and a mobile communication service according to the present invention.

FIG. 6 illustrates a structure of a hybrid terminal supporting both a broadcast service and a mobile communication service according to the present invention.

A hybrid terminal 600 of FIG. 6 includes a mobile communication terminal 610a and a broadcast receiver 610b. Basically, the hybrid terminal 600 is designed to allow the user to enjoy the broadcast service and the mobile communication service selectively or simultaneously. The hybrid terminal 600 transmits/receives a mobile communication signal via a first antenna ANT1, and receives a broadcast signal via a second antenna ANT2.

In FIG. 6, the mobile communication terminal 610a includes a Tx/Rx switch 611 for switching a transmission/ reception (Tx/Rx) signal in a front end of an RF path, a GSM receiver 612, a GSM transmitter 613, a transmission power controller 614 for controlling transmission power of the GSM transmitter 613 according to the present invention, and a gain controller 615 for controlling a gain of an amplifier 616 to increase/decrease transmission power of a GSM signal under the control of the transmission power controller 614. The broadcast receiver 610b is assumed as a DVB-H receiver.

In the present invention, when the DVB-H receiver 610b is activated or enabled, a first signal DVBH_ON indicating the activation of the DVB-H receiver 610b is transferred to the transmission power controller 614. When the hybrid terminal 600 receives DVB bursts 511 and 513 as shown in FIG. 5, a second signal BURST_ON indicating On/Off timing of the DVB bursts 511 and 513 according to a time slicing operation is transferred to the transmission power controller 614. Upon receiving both the first signal DVBH_ON and the second signal BURST_ON, the transmission power controller 614 recognizes that transmission of the DVB bursts 511 and 513 is performed at the corresponding slot.

In addition, the transmission power controller 614 detects an enable/disable state of the GSM transmitter 613, and when a transmission operation of the GSM transmitter 613 is performed during reception of DVB bursts 511 and 513, the transmission power controller 614 controls the gain controller 615 to reduce the transmission power of the GSM signal by the calculated level. Although the manner in which the transmission power controller 614 detects the enable/disable of the GSM transmitter 613 is not shown herein, the detection can be made through exchange of control signals between the transmission power controller 614 and the GSM transmitter 613.

In FIG. 6, the DVB-H receiver 610b can measure reception quality of a broadcast signal, and deliver a third signal indicating the measured reception quality DVBHQUAL to the transmission power controller 614. The present invention can control the transmission power of the GSM transmitter 613 using a selected one or all of the first to third signals, and a detailed control scheme therefor will be described below.

If the reception quality of the broadcast signal is a greater than or equal to a reference value, reduction of the GSM transmission power may be unnecessary. Therefore, the DVB-H receiver 610b determines whether the reception quality of the broadcast signal is greater than or equal to the reference value, and if so, the DVB-H receiver 610b transfers none of the first to third signals to the transmission power controller 614. Then the transmission power controller 614 can perform the normal power control.

Alternatively, when it is determined from the received third signal that the reception quality of the broadcast signal is high, for example, or greater than or equal to the reference value, the transmission power controller 614 can perform the normal GSM transmission power control regardless of the first and second signals.

In FIG. 6, the GSM receiver 612 receives a downlink signal or a control channel from the base station, and transfers reception quality information RXQUAL and reception power information RXLEV for uplink power control to the transmission power controller 614. The reception quality information RXQUAL and the reception power information RXLEV can be received over the control channel information shown in FIG. 3, or can be directly measured by the terminal. The transmission power control method based on the reception quality information RXQUAL and the reception power information RXLEV is equal to the method based on Equation (1) to Equation (3), so a detailed description thereof will be omitted herein.

Tables 2 and 3 show examples of the reception quality information RXQUAL and the reception power information RXLEV, respectively.

TABLE 2

| RX signal level | From (%) | To (%) |
|---|---|---|
| RXQUAL_0 | — | 0.2 |
| RXQUAL_1 | 0.2 | 0.4 |
| RXQUAL_2 | 0.4 | 0.8 |
| ... | ... | ... |
| RXQUAL_6 | 6.4 | 12.8 |
| RXQUAL_7 | 12.8 | — |

TABLE 3

| RX signal level | From (dBm) | To (dBm) |
|---|---|---|
| RXLEV_0 | — | −110 |
| RXLEV_1 | −110 | −109 |
| RXLEV_2 | −109 | −108 |
| ... | ... | ... |
| RXLEV_62 | −49 | −48 |
| RXLEV_63 | −48 | — |

The present invention discloses the following power control algorithm for controlling transmission power of the GSM transmitter 613 using not only the reception quality information RXQUAL and the reception power information RXLEV but also the first to third signals during reception of the broadcast signal.

When the DVB-H receiver 610b is activated, it outputs a first signal DVBH_ON with a value of '1', for example. When the DVB-H receiver 610b receives DVB bursts 511 and 513 of the channel selected according to the time slicing operation, it outputs a second signal BURST_ON with a value of '1', for example. The transmission power controller 614 can selectively receive and use, from the DVB-H receiver 610b, the third signal indicating reception quality DVBHQUAL of the broadcast signal. Upon receipt of the first and second signals with a value '1' during operation of the GSM transmitter 613, the transmission power controller 614 calculates a PU value for controlling transmission power of the GSM signal according to Equation (4), determining that the broadcast burst is received. In Equation (4), the third signal is used for PU value calculation.

$$PU = \alpha(RXLEV_{ref} - RXLEV_{rx}) + \beta(RXQUAL_{ref} - RXQUAL_{rx}) + \gamma_{on}(DVBHQUAL_{ref} - DVBHQUAL_{rx}), \quad (4)$$

for $$(\alpha > 0, \beta < 0, \gamma_{on} < 0)$$

A definition of variables used in the power control algorithm of the present invention is given in Table 4.

TABLE 4

| Variable | Description |
|---|---|
| $RXLEV_{ref}$ | Reference reception power level |
| $RXLEV_{rx}$ | Measured reception power level |
| $RXQUAL_{ref}$ | Reference reception quality (BER level) |
| $RXQUAL_{rx}$ | Measured reception quality (BER level) |
| $DVBHQUAL_{ref}$ | Reference reception quality of broadcast signal (BER level) |

TABLE 4-continued

| Variable | Description |
|---|---|
| $DVBHQUAL_{rx}$ | Measured reception quality of broadcast signal (BER level) |
| $\alpha, \beta, \gamma_{on}, \gamma_{off}$ | Weights |
| PL | Power level for transmission power adjustment |
| PC | Power control value |

The transmission power controller 614 finds an integer PC value by substituting the PU value calculated in Equation (4) into Equation (2), and transfers the PC value to the gain controller 615. The gain controller 615 updates a power level PL based on Equation (3) and the PC value. The gain controller 615 adjusts a gain of the amplifier 616 using the updated PL value, to control the transmission power of the GSM signal.

However, the simple decrease in the transmission power of the GSM signal may reduce the transmission power of the GSM signal as a whole, causing performance degradation of the GSM signal. Therefore, when there is no DVB burst in the slot interval, it is possible to prevent performance degradation of the hybrid terminal by increasing the transmission power of the GSM signal. In this manner, the transmission power of the GSM signal can be uniformly maintained on a time average basis.

When there is no broadcast burst, i.e. when the second signal BURST_ON has a value '0', the transmission power controller 614 calculates the PU value for increasing the GSM transmission power, according to Equation (5). The gain controller 615 finds the PL value updated according to Equation (3), and controls the GSM transmission power depending on the PL value. In Equation (5), $$PU = \alpha(RXLEV_{ref} - RXLEV_{rx}) + \beta(RXQUAL_{ref} - RXQUAL_{rx}) + \gamma_{on}(DVBHQUAL_{ref} - DVBHQUAL_{rx}), \quad (5)$$

for $(\alpha > 0, \beta < 0, \gamma_{off} > 0)$

Figure 7:
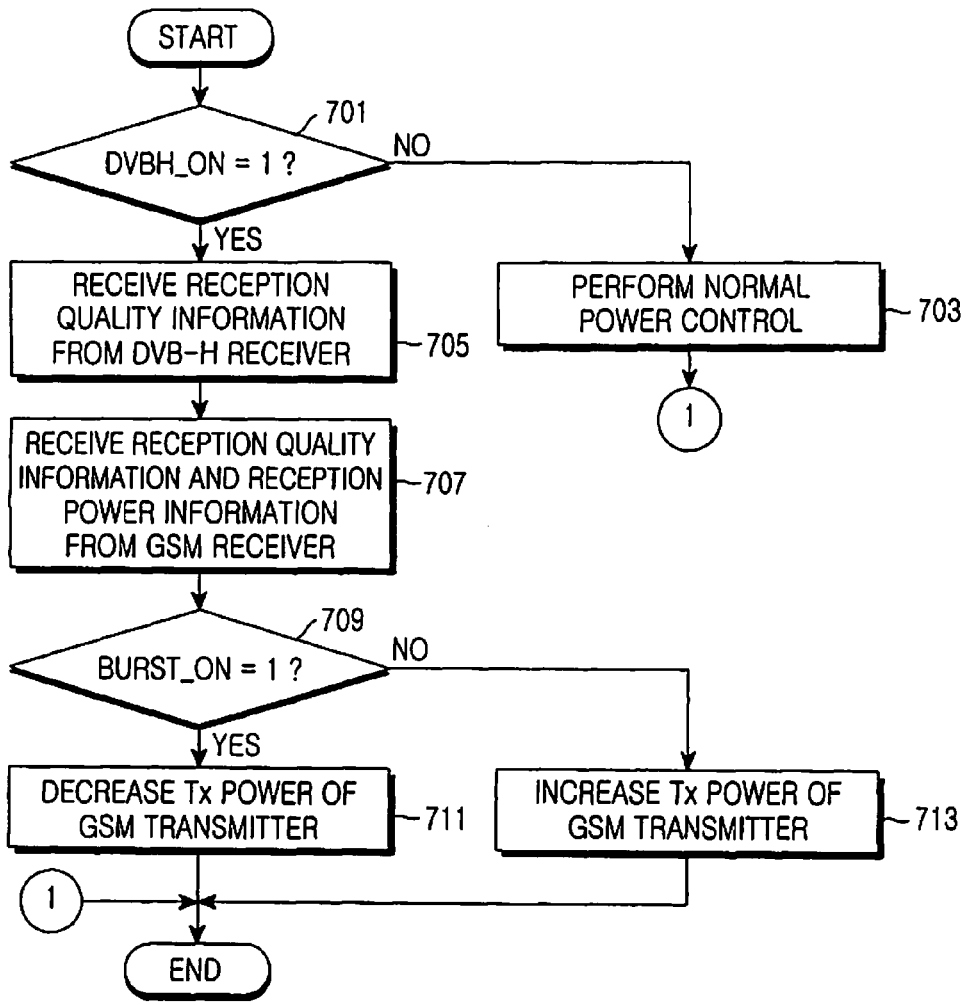
FIG. 7 illustrates an interference cancellation method in a hybrid terminal supporting both a broadcast service and a mobile communication service according to the present invention.

FIG. 7 illustrates an interference cancellation method in a hybrid terminal supporting both a broadcast service and a mobile communication service according to the present invention.

It is assumed in FIG. 7 that when the hybrid terminal simultaneously performs a transmission operation of the GSM signal by means of the mobile communication terminal 610a and a reception operation of the broadcast signal by means of the DVB-H receiver 610b, the GSM transmission signal serves as interference to the received broadcast signal.

Referring to FIG. 7, a transmission power controller 614 determines in step 701 whether a first signal DVBH_ON indicating the enable/disable state of a broadcast receiver, or DVB-H receiver 610b, is received. If it is determined in step 701 that the first signal DVBH_ON is '0' or not '1' the transmission power controller 614 performs normal power control in step 703, determining that the broadcast receiver is disabled. However, if it is determined in step 701 that the first signal DVBH_ON is '1', the transmission power controller 614 proceeds to step 705 where it receives a third signal indicating reception quality DVBHQUAL of the measured broadcast signal from the DVB-H receiver 610b. Thereafter, in step 707, the transmission power controller 614 receives, from the GSM receiver 612, reception quality information RXQUAL and reception power information RXLEV for uplink power control of the GSM signal. The operation of step 705 is optional, and the order of steps 705 and 707 is subject to change.

In step 709, the transmission power controller 614 checks a second signal BURST_ON indicating On/Off timing of the DVB bursts 511 and 513 received from the DVB-H receiver 610b. If it is determined in step 709 that the second signal BURST_ON has a value '1', the transmission power controller 614 performs in step 711a power control operation of decreasing transmission power of the GSM transmitter 613 as shown in FIG. 5, determining that a burst of the broadcast signal is received at the corresponding slot. In step 711, the transmission power controller 614 finds a PC value based on the PU value calculated in Equation (4), and delivers the PC value to the gain controller 615. The gain controller 615 decreases the power level PL based on Equation (3) and the PC value, to reduce the transmission power of the GSM signal by the calculated level in the interval where the burst of the broadcast signal is received.

However, if it is determined in step 709 that the second signal BURST_ON is '0' or not '1', the transmission power controller 614 performs in step 713 a power control operation of increasing the transmission power of the GSM transmitter 613 according to Equation (5), determining that the burst of the broadcast signal is not received at the corresponding slot.

As a result, when the transmission operation of the mobile communication signal and the reception operation of the broadcast signal are simultaneously performed, the method of FIG. 7 can cancel the interference during reception of the broadcast signal by controlling the transmission power of the mobile communication signal according to the presence/absence of the burst of the broadcast signal.

As is apparent from the foregoing description, the present invention determines whether the broadcast receiver is activated, determines whether there is any broadcast burst if the broadcast receiver is activated, and increases/decreases transmission power of the mobile communication signal according to the presence/absence of the broadcast burst, thereby improving reception performance of the broadcast receiver included in the hybrid terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for canceling interference during reception of a broadcast signal in a hybrid terminal supporting a broadcast service and a mobile communication service, the method comprising:
   determining whether there is a burst of a broadcast signal received at a current slot; and
   decreasing transmission power of a mobile communication signal at the corresponding slot if there is a burst of the broadcast signal.

2. The method of claim 1, further comprising:
   increasing transmission power of the mobile communication signal if there is no burst of the broadcast signal.

3. The method of claim 2, wherein the increasing step further comprises:
   calculating a Power Control value (PC) based on a target Power Update level (PU) calculated in the following equation, and increasing a Power Level (PL) based on the power control value PC, to increase transmission power of the mobile communication signal by the calculated level;

$$PU = \alpha(RXLEV_{ref} - RXLEV_{rx}) + \beta(RXQUAL_{ref} - RXQUAL_{rx}) + \gamma_{off}(DVBHQUAL_{ref} - DVBHQUAL_{rx}),$$

for $$(\alpha > 0, \beta < 0, \gamma_{off} > 0)$$

where $RXLEV_{ref}$ denotes reference reception power level, $RXLEV_{rx}$ denotes measured reception power level, $RXQUAL_{ref}$ denotes reference reception quality, $RXQUAL_{rx}$ denotes measured reception quality, $DVBHQUAL_{ref}$ denotes reference reception quality of a broadcast signal, $DVBHQUAL_{rx}$ denotes measured reception quality of a broadcast signal, and $\alpha$, $\beta$, $\gamma_{off}$ each denote a weight.

4. The method of claim 1, further comprising:
determining whether there is a mobile communication signal to transmit.

5. The method of claim 1, wherein the determining step further comprises:
determining whether a broadcast receiver is activated.

6. The method of claim 1, wherein the decreasing step further comprises:
decreasing transmission power of the mobile communication signal when reception quality of the broadcast signal is less than or equal to a reference value.

7. The method of claim 1, wherein the decreasing step further comprises:
decreasing transmission power of the mobile communication signal depending on at least one of reception quality information and reception power information for the mobile communication signal.

8. The method of claim 1, wherein the decreasing step further comprises:
calculating a Power Control value (PC) based on a target Power Update level (PU) calculated in the following equation, and decreasing a Power Level (PL) based on the power control value PC, to reduce transmission power of the mobile communication signal by the calculated level in an interval where a burst of the broadcast signal is received;

$$PU = \alpha(RXLEV_{ref} - RXLEV_{rx}) + \beta(RXQUAL_{ref} - RXQUAL_{rx}) + \gamma_{on}(DVBHQUAL_{ref} - DVBHQUAL_{rx}),$$

for $$(\alpha > 0, \beta < 0, \gamma_{on} < 0)$$

where $RXLEV_{ref}$ denotes reference reception power level, $RXLEV_{rx}$ denotes measured reception power level, $RXQUAL_{ref}$ denotes reference reception quality, $RXQUAL_{rx}$ denotes measured reception quality, $DVBHQUAL_{ref}$ denotes reference reception quality of a broadcast signal, $DVBHQUAL_{rx}$ denotes measured reception quality of broadcast signal, and $\alpha$, $\beta$ and $\gamma_{on}$ each denote a weight.

9. An apparatus for canceling interference during reception of a broadcast signal in a hybrid terminal including a broadcast receiver and a mobile communication terminal, the apparatus comprising:

a gain controller for adjusting transmission power of the mobile communication terminal; and
a transmission power controller for determining whether there is a burst of a broadcast signal that the broadcast receiver will receive, and controlling the gain controller to adjust transmission power of a mobile communication signal transmitted by the mobile communication terminal at a corresponding slot if there is a burst of the broadcast signal.

10. The apparatus of claim 9, wherein the transmission power controller controls the gain controller to increase transmission power of the mobile communication signal if there is no burst of the broadcast signal.

11. The apparatus of claim 10, wherein the transmission power controller calculates a Power Control value (PC) based on a target Power Update level (PU) calculated in the following equation and delivers the power control value PC to the gain controller, and the gain controller increases a Power Level (PL) based on the power control value PC, to increase transmission power of the mobile communication signal by the calculated level;

$$PU = \alpha(RXLEV_{ref} - RXLEV_{rx}) + \beta(RXQUAL_{ref} - RXQUAL_{rx}) + \gamma_{off}(DVBHQUAL_{ref} - DVBHQUAL_{rx}),$$

for $$(\alpha > 0, \beta < 0, \gamma_{off} > 0)$$

where $RXLEV_{ref}$ denotes reference reception power level, $RXLEV_{rx}$ denotes measured reception power level, $RXQUAL_{ref}$ denotes reference reception quality, $RXQUAL_{rx}$ denotes measured reception quality, $DVBHQUAL_{ref}$ denotes reference reception quality of a broadcast signal, $DVBHQUAL_{rx}$ denotes measured reception quality of a broadcast signal, and $\alpha$, $\beta$, $\gamma_{off}$ each denote a weight.

12. The apparatus of claim 9, wherein the transmission power controller decreases transmission power of the mobile communication signal if reception quality of the broadcast signal is less than or equal to a reference value.

13. The apparatus of claim 9, wherein the transmission power controller decreases transmission power of the mobile communication signal depending on at least one of reception quality information and reception power information for the mobile communication signal.

14. The apparatus of claim 9, wherein the transmission power controller calculates a Power Control value (PC) based on a target Power Update level (PU) calculated in the following equation and delivers the power control value PC to the gain controller, and the gain controller decreases a Power Level (PL) based on the power control value PC, to reduce transmission power of the mobile communication signal by the calculated level in an interval where a burst of the broadcast signal is received;

$$PU = \alpha(RXLEV_{ref} - RXLEV_{rx}) + \beta(RXQUAL_{ref} - RXQUAL_{rx}) + \gamma_{on}(DVBHQUAL_{ref} - DVBHQUAL_{rx}),$$

for $$(\alpha > 0, \beta < 0, \gamma_{on} < 0)$$

where $RXLEV_{ref}$ denotes reference reception power level, $RXLEV_{rx}$ denotes measured reception power level, RXQUAL$_{ref}$ denotes reference reception quality, RXQUAL$_{rx}$ denotes measured reception quality, DVBHQUAL$_{ref}$ denotes reference reception quality of a broadcast signal, DVBHQUAL$_{rx}$ denotes measured reception quality of broadcast signal, and $\alpha$, $\beta$ and $\gamma_{on}$ each denote a weight.

15. A hybrid terminal supporting a broadcast service and a mobile communication service, the hybrid terminal comprising:
- a broadcast receiver for receiving a broadcast signal;
- a transmitter/receiver for transmitting/receiving a mobile communication signal;
- a gain controller for adjusting transmission power of the mobile communication signal; and
- a transmission power controller for determining whether the broadcast receiver is activated and whether there is a burst of the broadcast signal, and controlling the gain controller to adjust transmission power of the mobile communication signal at a corresponding slot if the broadcast receiver is activated and there is a burst of the broadcast signal.

16. The hybrid terminal of claim 15, wherein the transmission power controller controls the gain controller to increase transmission power of the mobile communication signal if the broadcast receiver is activated but there is no burst of the broadcast signal.

17. The hybrid terminal of claim 15, wherein the transmission power controller decreases transmission power of the mobile communication signal depending on reception quality information of the broadcast signal.

18. The hybrid terminal of claim 17, wherein the transmission power controller performs normal power control for transmission of the mobile communication signal if reception quality of the broadcast signal is greater than or equal to a reference value.

19. The hybrid terminal of claim 15, wherein the transmission power controller decreases transmission power of the mobile communication signal depending on at least one of reception quality information and reception power information for the mobile communication signal.

* * * * *